E. R. FROST.
CORD SUPPORT FOR ELECTRIC LIGHTS.
APPLICATION FILED APR. 8, 1920.

1,424,999.

Patented Aug. 8, 1922.

Inventor
Ernest R. Frost
By Brown, Boettcher, Dunner
Attorneys

UNITED STATES PATENT OFFICE.

ERNEST R. FROST, OF CHICAGO, ILLINOIS.

CORD SUPPORT FOR ELECTRIC LIGHTS.

1,424,999.     Specification of Letters Patent.     Patented Aug. 8, 1922.

Application filed April 3, 1920. Serial No. 372,249.

*To all whom it may concern:*

Be it known that I, ERNEST R. FROST, a citizen of the United States, residing at Chicago, in the county of Cook and State of Illinois, have invented a certain new and useful Improvement in Cord Supports for Electric Lights, of which the following is a full, clear, concise and exact description, reference being had to the accompanying drawings forming a part of this specification.

My invention relates to cord supports for electric lights, and particularly to that form of support wherein an adjustable takeup is provided for varying the length of the cord. This invention being an improvement over the device shown in Patent No. 1,219,881, issued to M. N. Narum and P. L. Jacobson on March 23, 1909.

While my invention is particularly adapted for use in connection with supporting electric conductors for electric lights, I do not intend to limit my invention to such use or purpose only, as it is apparent that it has a broad field of adaptability and utility.

Devices of the prior art usually comprise a winding drum, a bracket for supporting the drum, and a spring suitably carried by the drum for placing the same under spring tension when revolved, so that after it is released, it will wind the cord thereon, thereby removing the electric light to a remote or out-of-the-way place. It was customary to mount the bracket preferably over the place where the light was desired and to drop the cord therefrom. This provided a neat arrangement so long as the electric light was directly perpendicular to the support, but as soon as the light was removed from that perpendicular position to an angular position, difficulties were encountered. Moving the light to an angular position was often necessary, especially when employed around large machines on which it is necessary to make adjustment of parts not in the direct path of the light. The inability of the bracket to permit the drum to freely swing in alignment with the cord put an undue wearing strain upon the cord which in time caused the cord to break and give way.

The present invention aims to provide an improved form of cord support in which the bracket is so constructed that a pivotal connection is provided to permit the drum or pulley to freely align itself with any position in which the lamp may be placed.

The present invention aims to further provide an improved form of cord and conductor connector wherein the length of the electric conductor may be varied without requiring the removal of the lamp socket from the conductor.

A still further aim of my invention is provision of a cord support of simple, durable, and reliable construction, which is inexpensive to manufacture and one which is universal in its adaptation, being capable of assuming any angular position in respect to its mounting.

Other aims of my invention not hereinbefore set forth will appear from the following detail description and the claims, taken with an inspection of the accompanying drawings, in which:

Figure 1:
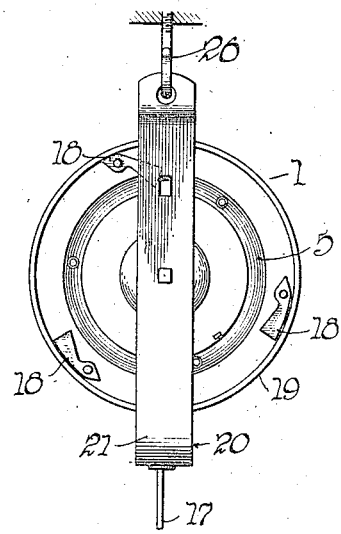
Figure 1 shows in front elevational view a device embodying my invention and illustrating the same in perpendicular position.
Figure 2:
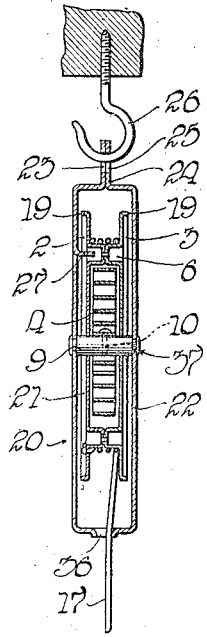
Figure 2 is a vertical cross section of the same illustrating the interior of the winding pulley.
Figure 3:
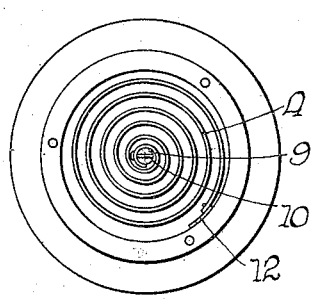
Figure 3 shows in elevational view, one of the plates forming a winding pulley and the manner of carrying the spring within the pulley.

Referring to the drawings wherein I have shown one form of my invention, the pulley or winding drum 1 comprises preferably the metallic disks or plates 2 and 3. The plates 2 and 3 are secured together in such a manner as to form a housing in which the spring 4 is disposed. Formed, as by pressing or the like, on the outside faces of the plates and preferably nearer the periphery thereof, are the annular channels 5 and 6. These channels or grooves 5 and 6 provide means for securing the respective plates together, the inner walls of the channels of each plate being butted together so that they may be riveted or otherwise suitably fastened. In Figure 2 the disk 2 is shown with openings punched in the inner wall of the annular channel 5, while the disk 3 is provided with openings punched therein without removing the metal so as to form an eyelet. The openings in the disk 2 are adapted to register with the eyelets of the disk 3, the eyelets passing therethrough and riveted within the channel 5, thereby substantially securing the two disks together in such a manner that a space is formed therebetween to carry the spring 4. The form of pulley in this case is not of the essence of my invention, and it is apparent that various forms may be used.

The pulley 1 is rotatably mounted upon the shaft 9 having its ends square, the purpose of which will be hereinafter described. As mentioned, the helical torsional spring 4 is disposed within the housing of the pulley, the inner end is preferably secured to the shaft by means of the pin 10, while the outer end is provided with an aperture 11 adapted to receive a fastening member 12. The fastening member 12 is provided with a tongue 13 which enters the aperture 11, and which is provided with a cross head 14 to prevent withdrawal of the tongue after it has been secured in position. The fastening member 12 is also provided with a cross head 15 at the other end of the tongue which is of an equal width to the space between the plates 2 and 3, and which has projections 16 extending through apertures provided in the plates. Thus it will be seen that the ends of the spring are securely fastened to the disk, as well as the fastening member 12.

An annular groove is provided between the plates 2 and 3 and in this groove the cord 17 is adapted to be wound. Unwinding the pulley causes the torsional spring 4 to energize, thereby placing the pulley under tension. In order to hold the pulley under tension during adjustment, dogs 18 are provided on either of the plates 2 and 3, but in this instance I have shown them provided on the plate 2. These dogs are of well known design and are preferably pivoted to the plate 2 so that, when the pulley revolves, they will be free to swing in and out as is desired. If it is desired to unwind the cord 17 from the pulley, for a certain distance, the revolving of the pulley causes the dogs 18 to centrifugally swing against the bead 19 formed on the periphery of the plates, but as soon as the rotation of the pulley stops gravity causes the dog at the uppermost position to drop and catch against the lug 27 of the hanger 20, which will be presently described. The lug 27 is so positioned that during normal rotation of the pulley, the dogs will not be engaged due to the centrifugal force keeping them extended in outer position. To rewind, the cord 17 is first pulled downwardly for a short distance and then let go, thereby permitting centrifugal force to swing the holding dog out of the path of the lug 27.

The hanger 20, which is made preferably of sheet metal, is bent in the shape of a U-bar, which forms the sides 21 and 22 extending diametrically vertical to the pulley. The upper ends of the sides 21 and 22 are bent laterally inwardly, ending in vertical extending members 23 and 24 respectively. Provided in these vertical members 23 and 24 is the aperture 25 adapted for the reception of the hook 26. The hook 26 is of the common loop type and is adapted to thread into the ceiling or wherever the cord support is desired, preferably near an electrical outlet.

If desired, a plurality of these hooks may be provided at different points, and when it is desired to use the lamp, the cord support may be fastened to the nearest hook, thereby making it changeable and capable of being used at more than one place.

As heretofore mentioned the ends of the shaft 9 are formed square. The vertical sides 21 and 22 of the hanger 20 are provided with square openings which are adapted to receive the square ends of the shaft 9. After the shaft is placed in the hanger the projecting square ends are flattened or riveted as indicated at 37 in Figure 2. The lower end of the hanger 20 is also provided with an aperture through which the cord 17 is adapted to pass. It will be noted by referring to Figure 2 that the periphery of this aperture is finished so as to provide a smooth surface to prevent wear on the cord 17.

Figure 5:
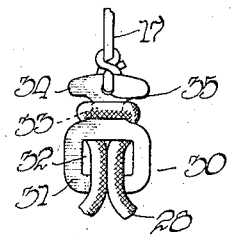
Figure 5 shows in elevation the cord and connector and the manner of fastening the conductor to the connector.
Figure 6:
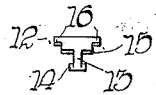
Figure 6 is a detail view of a device for connecting the outer end of the spring within or connecting the outer end of the spring with the pulley plate.
Figure 7:
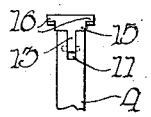
Figure 7 is a similar view showing the device as it is connected with the end of the spring.
Figure 4:
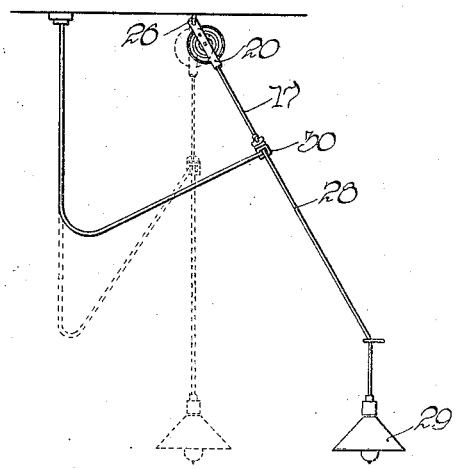
Figure 4 shows diagrammatically the lamp suspended in angular position.

By reference to Figure 4, wherein I have shown diagrammatically a lamp suspended in an angular position, it will be noted that a suitable connector 30 is provided to join the cord 17 and the conductor 28 of the lamp circuit, having the lamp 29 secured to its free end. The connector 30, shown in Figure 5 is preferably made of insulation of suitable fibrous material and comprises the substantially rectangular portion 31 having an aperture 32 therein, the neck 33 having its periphery curved to the contour of the conductor, and the head 34 with the aperture 35 therein. In order to fasten the conductor 28 to the connector 30, a loop is made and passed through the aperture 32 up around the head 34, where it is looped around the neck 33. It is thus apparent that adjustment of the conductor between the connector 30 and lamp 29 may be made without necessarily removing the lamp socket or cord 17.

As described, the hanger 20 at the upper end is provided with an aperture 25 which is adapted to receive the hook 26. This arrangement permits the bracket 26 to align itself with the cord 17 when the lamp is swung or suspended at an angle to the hook 26. This is advantageous in that it is not necessary to first unwind the cord 17 from the pulley 1 the desired length before the lamp 29 is suspended at the desired distance. The lamp 29 may be swung to the place of suspension while at the same time the bracket 20 will pivotally align itself on the hook 26, thereby permitting the pulling force exerted on the cord 17 to be directly in alignment with the central axis of the cord support. Thus the cord 17 will always be passing through the aperture 36 in the lower end of the hanger 20 at a constant angle, thereby reducing the wearing strain on the cord 17.

As before mentioned, the cord 17 is wound and unwound from the pulley 1 by placing the torsional spring 4 under tension, and consequently the pulley, and by normally locking the pulley in position by means of the dogs 18 engaging the lug 27 formed on the hanger or bracket 20. This unwinding takes place when the lamp is to be used at a remote position from normal suspension. When it is desired to return or raise the lamp, the conductor 28 or cord 17 is first drawn outwardly, then released or lifted quickly, thus permitting the pulley to revolve with sufficient rapidity to carry the dogs 18 past the stop without swinging inwardly to locked position. When the lamp has been raised to the desired height, its movement is restrained by holding the cord or conductor, thereby permitting one of the dogs 18 to drop into locking position.

It is to be understood that my invention is capable of various modifications and adaptations without departing from the features of my invention.

I claim:

In combination, a take-up mechanism comprising, a plurality of disks having the material pressed inwardly to form spacing ribs in each face and an annular channel in one, said disks being arranged with the ribs abutting each other whereby a spring retaining cavity is formed, a winding spring located in said cavity, centrifugal controlled dogs on one of said disks, a hanger bracket pivotally carrying said disks comprising, opposite parallel bar members integrally joined at the lower end, a lug struck out from one of the bar members to form a stop for said dogs in riding in said annular channel, the upper end of said brackets meeting face to face wherein an aperture is formed to provide insertion of a supporting hook.

In witness whereof I hereunto subscribe my name this 5th day of April, 1920.

ERNEST R. FROST.